(12) United States Patent
Mikowychok

(10) Patent No.: US 9,139,966 B1
(45) Date of Patent: Sep. 22, 2015

(54) VIBRATOR MECHANISM USABLE WITH A CONCRETE FINISHING TOOL

(71) Applicant: Frank Mikowychok, Lincoln, CA (US)

(72) Inventor: Frank Mikowychok, Lincoln, CA (US)

(*) Notice: Subject to any disclaimer, the term of this patent is extended or adjusted under 35 U.S.C. 154(b) by 0 days.

(21) Appl. No.: 14/304,019

(22) Filed: Jun. 13, 2014

(51) Int. Cl.
  *E01C 19/40* (2006.01)
  *E01C 19/38* (2006.01)
  *E01C 19/35* (2006.01)

(52) U.S. Cl.
  CPC .......... *E01C 19/38* (2013.01); *E01C 19/35* (2013.01); *E01C 19/40* (2013.01)

(58) Field of Classification Search
  CPC .......... E01C 19/35; E01C 19/38; E01C 19/40
  USPC ................................ 404/113, 114
  See application file for complete search history.

(56) References Cited

U.S. PATENT DOCUMENTS

| | | | | |
|---|---|---|---|---|
| 2,740,336 A * | 4/1956 | Degen | | 404/113 |
| 3,188,054 A * | 6/1965 | Mason, Jr. | | 366/121 |
| 5,234,283 A * | 8/1993 | Adkins | | 404/97 |
| 5,632,569 A | 5/1997 | Szmansky | | |
| 6,139,217 A | 10/2000 | Reuter | | |
| 6,231,331 B1 | 5/2001 | Lievers | | |
| 6,976,909 B1 * | 12/2005 | Hoover | | 451/354 |
| 6,988,851 B2 | 1/2006 | Sina | | |
| 7,097,384 B2 | 8/2006 | Lindley | | |
| 7,465,121 B1 | 12/2008 | Hendricks et al. | | |
| 8,230,760 B1 | 7/2012 | Breeding | | |
| 8,262,440 B2 * | 9/2012 | Krompack | | 451/359 |
| 2005/0036837 A1 * | 2/2005 | Marshall | | 404/114 |
| 2008/0050177 A1 * | 2/2008 | Sager | | 404/112 |

* cited by examiner

*Primary Examiner* — Raymond W Addie
(74) *Attorney, Agent, or Firm* — Whitley Legal Group, P.C.; AnnMarie W. Whitley

(57) ABSTRACT

A vibration imparting device for a concrete finishing tool utilizing a housing having a chamber surrounded by an inner surface of the housing. A vibrator and a battery are placed within the chamber. The vibrator includes a resilient collar to separate the vibrator from the housing inner surface. First and second adaptors are employed for the housing to be placed between the handle and the terminus of a concrete finishing tool.

10 Claims, 4 Drawing Sheets

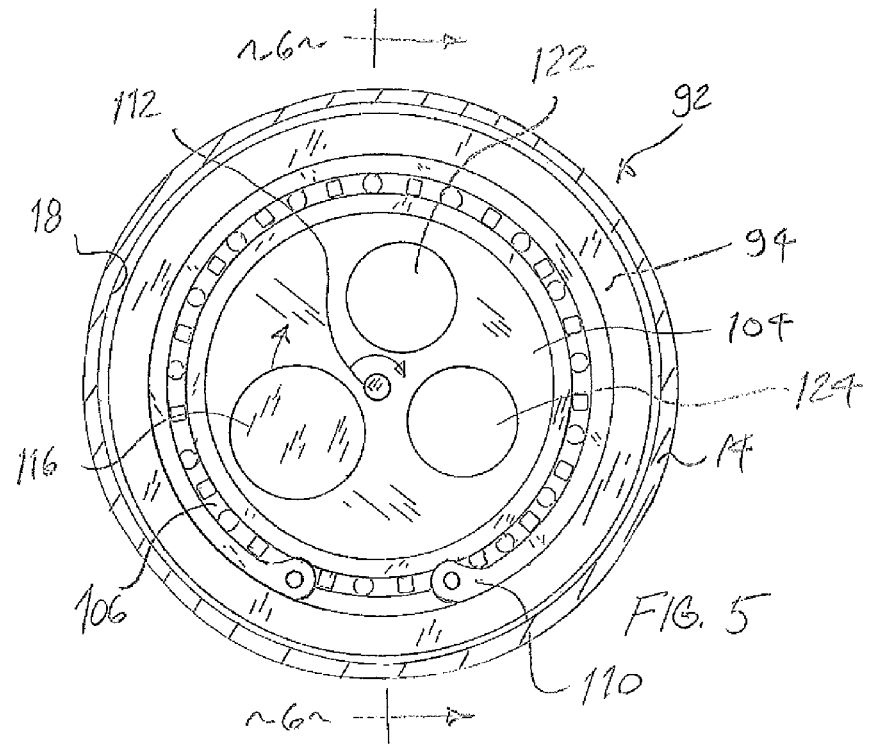
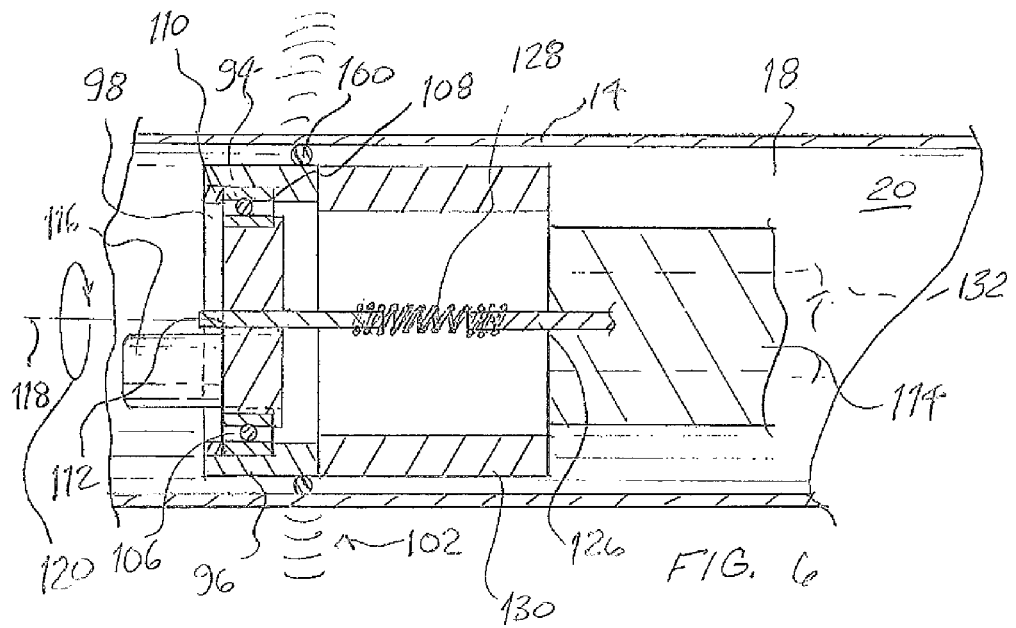

VIBRATOR MECHANISM USABLE WITH A CONCRETE FINISHING TOOL

CROSS-REFERENCE TO RELATED APPLICATIONS

The present application is a continuation-in-part of U.S. patent application Ser. No. 13/947,720 filed 22 Jul. 2013.

BACKGROUND OF THE INVENTION

The present invention relates to a novel and useful vibration departing device for a concrete finishing tool.

Concrete finishing tools, such as floats, jointers, screeds and the like, are used to provide a particular finished surface adjusted to a freshly poured concrete mass. In the conventional method of use of such concrete finishing tools, an operator moves the tool across the surface of the freshly poured concrete, usually in a back and forth manner, before the concrete mass cures or dries.

It has also been recognized that the addition of a vibratory action to the concrete finishing tool aids in the creation of a surface, characteristic, such as a smooth surface and in the case of a jointer, possesses a groove to control cracking of the finish concrete slab.

In the past, various tools have been proposed to provide a vibration motion to concrete finishing tools. For example, U.S. Pat. Nos. 6,231,331, 6,988,851, 7,097,384, and 8,230,760 show concrete vibrating devices in which an external motor is mounted to a handle or shaft and linked to a remote vibration mechanism by the use of a cable or gear mechanism.

U.S. Pat. No. 6,139,217 shows a concrete finishing tool in which a power source is placed within the handle of the concrete finishing tool and provides power to vibrators that are located atop of the head of the finishing tool adjacent the concrete.

U.S. Pat. Nos. 5,632,569 and 7,465,121 show hand held cement and concrete finishing tools in which a vibrator is placed within the handle structure of the tools and powered by a battery that is also found in the handle. These tools do not show a method for controlling the vibration within the handle, other than by control of electrical power to the vibrating mechanism.

A vibration imparting device for a concrete finishing tool that is self-contained and between the handle and terminus of the concrete finishing tool and allows for optimum vibration of the vibrating mechanism would be a notable advance in the construction arts.

SUMMARY OF THE INVENTION

In accordance with the present invention a novel and useful vibration imparting device for a concrete finishing tool is herein provided.

The device of the present invention utilizes a housing having a chamber formed by an inner surface or wall of the housing. The housing is sized to accommodate a vibrator and an electrical battery to provide electrical power to the vibrator.

The vibrator, positioned within the chamber of the housing, includes a resilient collar that surrounds and contacts the vibrator in the housing inner wall. The resilient collar forms a spaced relationship between the vibrator and the housing inner surface within the chamber. In addition, an anchor holds the vibrator within the chamber in the spaced relationship formed by the collar lying between the housing inner surface and the vibrator.

A first adaptor removably connects the housing to the handle of the concrete finishing tool, while a second adaptor removably connects the housing to the terminus of the concrete finishing tool.

At least one spacer is interposed the electrical battery and the housing inner wall. A holder is also used to fix the electrical battery within the housing chamber. In this manner, the spacer and the holder obviates damage to the battery due to the vibratory motion and imparted by the vibrator.

Another embodiment of the present invention concerns a vibrator mechanism which may be employed with the housing and the first and second adaptors connecting the housing to the handle and the terminus of the concrete finishing tool. The vibrator mechanism utilizes a support that is located within the chamber of the housing. The support is formed with a bore through the same. A rotor is located within the bore of the support and is adapted to turn or rotate relative to the support. The rotor also includes a shaft that extends outwardly from the rotor, as well a weighted body that is connected to the rotor apart from the shaft, producing vibration.

The vibrator mechanism is also provided with a motor having an output shaft and utilizes a source of energy, such as the battery prior described. A resilient link, such as a spring connects the outward shaft of the motor to the shaft of the rotor that extends from the support.

Such vibrator mechanism also includes a resilient band, such as an "O" ring, that at least partially surrounds the outer surface of the support and contacts the inner surface of the housing. Vibrations are transmitted to the housing from the rotor via such resilient band.

It may be apparent that a novel and useful vibration imparting device for a concrete finishing tool is hereinabove provided.

It is therefore an object of the present invention to provide a vibration imparting device for a concrete finishing tool that may be removably located between the handle and terminus of a concrete finishing tool.

Another object of the present invention is to provide a vibration imparting device for a concrete finishing tool that utilizes a vibrator that is resiliently suspended within a housing and allowed to impart vibration by the use of resilient collar placed between the inner wall of the housing and the vibrator.

Another object of the present invention is to provide a vibrator mechanism that includes a resilient band that transfers the vibrations to a housing and includes a resilient linkage between a motor shaft and a shaft of a rotor possessing an eccentric weight.

Another object of the present invention is to provide a vibration imparting device for a concrete finishing tool that is adaptable for various finishing tool terminii such as floats, jointers, screeds, and the like.

A further object of the present invention is to provide a vibration imparting device for a concrete finishing tool that is simple to retrofit in a concrete finishing tool and is easy to operate and maintain for use.

Yet another object of the present invention is to provide a vibration imparting device for a concrete finishing tool that is relatively lightweight and easy to handle due to a compact structure.

The invention possesses other objects and advantages especially as concerns particular characteristics and features thereof which will become apparent as the specification continues.

BRIEF DESCRIPTION OF THE SEVERAL VIEWS OF THE DRAWING

FIG. 5 is a front elevational view of another embodiment of a vibrator mechanism usable in the tool of the present application, with the housing depicted in section.

FIG. 6 is a sectional view taken along line 6-6 of FIG. 5.

Figure 1:
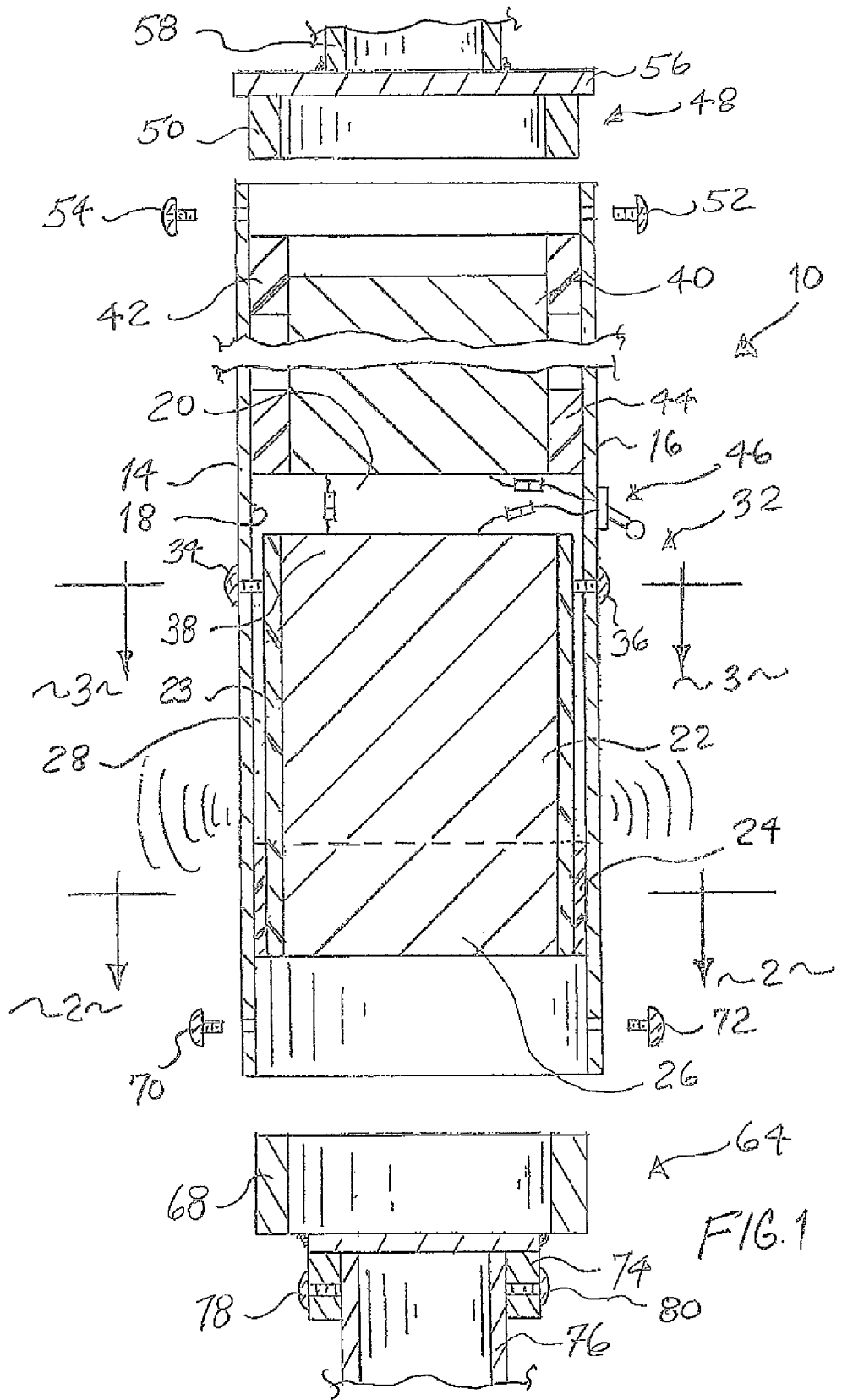
FIG. 1 is a partially exploded and broken sectional view of the vibration imparting device of the present invention interposed the handle and the terminus of a concrete finishing tool.

For a better understanding of the invention reference is made to the following detailed description of the preferred embodiments of the invention which should be taken in conjunction with the above described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior described drawings.

An embodiment of a vibrator mechanism as whole is depicted in the drawings by reference character 10. Device 10 is intended to impart vibration to a concrete finishing tool 12 shown in FIG. 4. Device 10, FIG. 1 includes, as one of its elements, a housing 14 which may take the form of a cylindrical tube formed of any rigid or semi-rigid material, such as metal, plastic, wood, and the like. For example, aluminum tubing suffices in the construction of housing 14. Housing 14 is sized to accommodate installation in existing concrete finishing tools, which will be discussed in greater detail as the specification continues.

Figure 2:
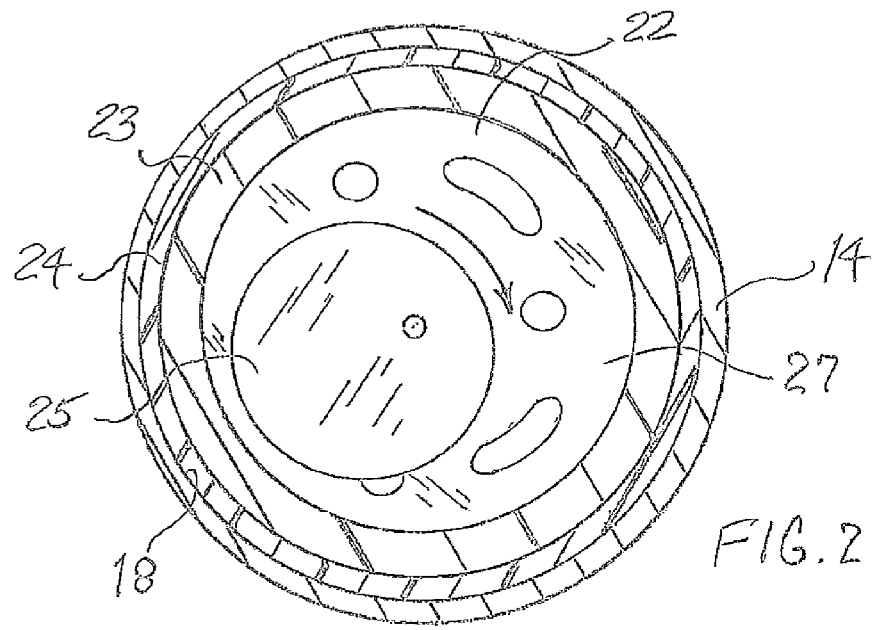
FIG. 2 is a sectional view taken along line 2-2 of FIG. 1.
Figure 3:
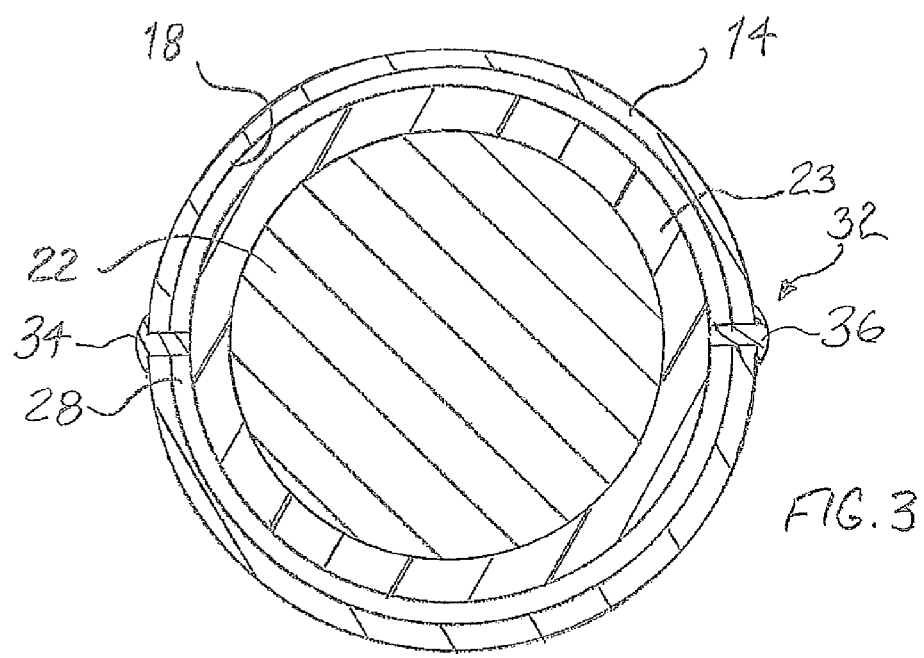
FIG. 3 is a sectional view taken along line 3-3 of FIG. 1.

Again, referring to FIG. 1, it may be observed that a vibrator 22 is position within chamber 20 of housing 14. Vibrator 22 may take the form of a vibrator sold under the designation "Grand Daddy Vibrator", model number TS770, 4.0-14 VDC, 1.4, inches diameter, sold by Surplus Traders, New York City, N.Y. Most importantly, vibrator is supported within chamber 40 by a resilient collar 24 which extends around vibrator 22 at end 26 thereof. Collar 24 may be constructed of rubber, plastic or other like material. Resilient collar 24 forms a space 28 between inner walls or surface 18 of housing 14 and vibrator 22, FIGS. 1 and 2. Thus, the vibrations indicated by vibration lines 30, FIG. 1, imparted by vibrator 22 are transmitted to housing 14 and to terminus of a finishing tool connected to housing 14 via resilient collar 24. As my be apparent from FIG. 2, vibrator 22 includes an outer plastic sheath 23 that directly contacts resilient collar 24. In addition, eccentric disc 25 of vibrator 22 is shown extended from motor plate 27. Eccentric disc turns per directional arrow 29 in creating vibrations. The connection of housing 14 to a concrete finishing tool 12 will be discussed hereinafter. An anchor 32 maintains the establishment of space 28 between vibrator 22 and housing 14. Anchor 32 is shown in FIGS. 1 and 3 as set screws 34 and 36 which extend through housing 14 and bear against end 38 of vibrator 22. In this manner, vibrator 22 is biased to move at end 26, nearest to finishing tool terminus 66, FIG. 4. Contact of vibrator 22 directly to inner surface 18 of housing 14 would greatly impede the imparting of vibration to finishing tool 12.

Returning to FIG. 1, it may be seen that an electrical battery 40 is also located in chamber 20 of housing 14. Electrical battery may take the form of a 14.4 volt NiCAD, 12 cell, 4,000 MAH, item number TEC90012, available from Batteries Plus of Rocklin, Calif. Battery 40 is positioned or fixed within chamber 20 against movement by the friction of spacers 42 and 44 mounted to the end portions of electrical battery 14. Consequently, electrical battery 14 fits snuggly within chamber 20 of housing 14. However, additional screws may be passed through housing 14 to engage spacers 42 and 44 to prevent slippage of electrical battery 40 within chamber 20 (not shown). An electrical switch and conventional connectors 46 electrically connect electrical battery 40 to vibrator 22 and permit the activation of vibrator 22 from the exterior of housing 14.

A first adaptor 48 is also found in device 10 and includes a flange 50 that fits within chamber 20 within housing 14. Set screws 52 and 54 extending through housing 14 engage flanges 50 when it is placed within chamber 14 in order to hold first adaptor to housing 14. First adaptor also includes a plate 56 and a tube 58 which is welded to plate 56. Tube 58 is intended to be connected to the handle 60 of concrete finishing tool 12, FIG. 4, and, in the embodiment depicted in the drawings, serves as a female end to device 10. A set screw 62 passes through handle 60 and engages tube 58 in order to hold device 10 to handle 60.

Figure 4:
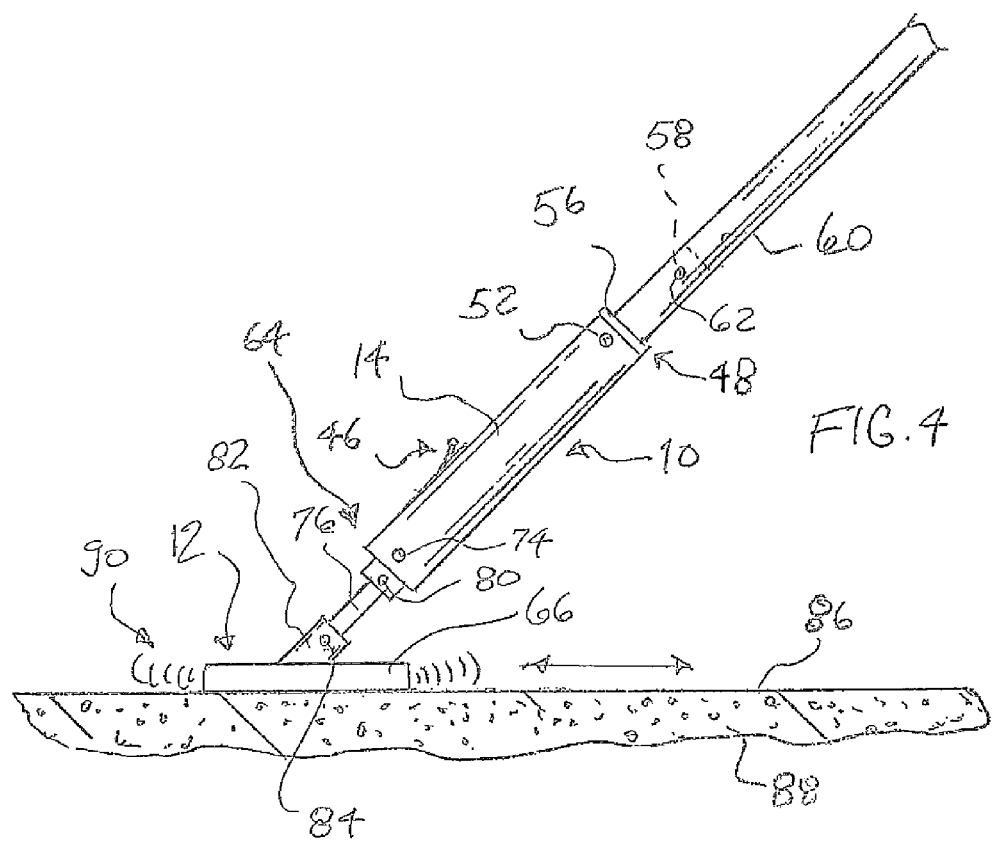
FIG. 4 is a side partial elevational view of a concrete finishing tool with the device for imparting vibration of the present invention installed therein.

A second adaptor 64, FIG. 1, connects device 10 to the terminus 66 of concrete finishing tool 12. Concrete finishing tool 12 is depicted in FIG. 4, as being a float. Adaptor 64 includes a flange 66 that fits within chamber 20 of housing 14 and is fixed there within by set screws 70 and 72. A hollow boss 74 is welded to flange 68 and includes a tube 76 which extends outwardly from the same. Set screws 78 and 80 hold tube 76 within hollow boss 74.

Referring to FIG. 4, it may be observed that tube 76 serves as a male fitting and fits within a coupler 82 of concrete finishing tool terminus 66. A set screw 84 holds tube 76 to terminus 66 and, thus, holds device 10 to terminus 66. It should be realized that a conventional spring loaded button on tube 76 may interact with an opening in coupler 82 of terminus 66 to serve as a quick installing and removing mechanism in substitution for set screw 84.

Viewing now FIGS. 5 and 6, another embodiment 92 of a vibrator mechanism is depicted. Vibrator mechanism 92 is employed as an alternate to the vibration imparting device 10 within housing 14, FIG. 1. In other words, vibrator mechanism 92 would be used in device 10 in place of vibrator and motor 22 depicted in FIG. 1. Also, it should be realized that vibrator mechanism 92 would be connected to terminus 66 and handle 60 via the connection mechanism depicted in FIGS. 1-4 for use in concrete finishing tool 14. Vibrator mechanism 92 includes as one of its elements a support 94 which is located within housing chamber 20. Support 94 includes an outer surface 96 and a bore 98 therethrough. "O" ring 100 serves to transmit vibration from vibration mechanism 92 to housing 14 as part of the concrete finishing tool 14 when used with wet concrete, schematically illustrated by vibration lines 102, FIG. 6.

Referring again to FIGS. 5 and 6, a rotor 104 lies within bore 98 of support 94. A roller bearing 106 interspaces roller bearing 106 and support 94. Specifically, roller bearing 106 lies against a shoulder 108 of support 94, best shown in FIG. 6, and a spring clip 110. Rotor 104 is also fashioned with a shaft 112 that extends into chamber 20 toward motor 114, which may be battery operated in the same manner as vibrator 22 depicted in FIG. 1. In addition, rotor 104 includes a weighted body 116 that is embedded in rotor 104 and lies apart from shaft 112 in an eccentric manner. Needless to say, shaft 116 rotates about an axis 118 according to directional arrow 120, FIG. 6, to generate vibrations. Openings 122 and 124 pass through rotor 122 and serve as access openings to chamber 20 of housing 14.

Referring again to FIG. 6, it may be observed that motor 114 includes an output shaft 126. A resilient link 128 connects shaft 112 of rotor 104 to output shaft 126 of motor 114. Resilient link 128 may take the form of a coil spring as shown in FIG. 6. In this manner, motor 114 is isolated from the vibration generated by rotating rotor 104, to a large degree. Mount 130 connects to support 94 and serves to hold motor 114 in place by a pair of flanges, one flange 132 being shown in phantom on FIG. 6.

A resilient band, that may be in the form of an "O" ring 100, surrounds support 94 and contacts the inner surface 18 of housing 14 and the outer surface 96 of support 94. Vibrations generated by rotor 104 are transmitted from rotor 104 and rotor support 94 to housing 14.

In operation, the user inserts device 10 between handle 60 and terminus 66 of concrete finishing tool, FIG. 4. Tube 58 of first adaptor 48 fits within hollow handle 60. Likewise, second adaptor 64 allows the connection of device 10 to terminus 66 of concrete finishing tool 10 by the use of a tube 76 which fits into hollow adaptor 84 of terminus 66. Set screws 62 and 84 connect adaptors 48 and 64 to handle 60 and terminus 66 of concrete finishing tool 12, respectively. Once device 10 is installed as shown in FIG. 4, the concrete finishing tool 12 is moved along the surface 86 of soft concrete mass 88 to effect the particular finish on surface 86. In the instance where concrete finishing tool is a float, as shown in FIG. 4, a smooth surface 86 is produced. However, other concrete finishing tools may be employed to produce a rough surface or to create grooves in concrete mass 80, as is the case with a jointer. Nevertheless, vibrations originated from vibrator 22 within casing 14 of device are biased for transmission through adaptor 64 to concrete finishing tool 12 is indicated by vibration lines 90.

In addition, device 10 would operate in a similar manner by the use of vibrator mechanism 92 depicted in FIGS. 5 and 6 in substitution for vibrator 22 by placing vibrator mechanism 92 within housing 14.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A vibrator mechanism usable with a concrete finishing tool having a handle and a terminus; comprising:
   a. a housing, said housing including a chamber therewithin formed by an inner surface of said housing;
   b. a support said support located within said housing chamber said support including an outer surface and a bore there-through.
   c. a resilient band at least partially surrounding said outer surface and contacting said inner surface of said housing;
   d. a rotor located within said bore of said support and being adapted to turn relative to said support, said rotor further comprising a shaft extending outwardly from said rotor, and weighted body connected to said rotor apart from said shaft;
   e. a motor, said motor possessing an output shaft; and
   f. a resilient link, said resilient link connecting said output shaft of said motor to said shaft of said rotor.

2. The mechanism of claim 1 in which said motor lies within said housing chamber.

3. The mechanism of claim 1 in which said resilient link comprises a spring.

4. The mechanism of claim 1 in which said resilient band comprises an "O" ring.

5. The mechanism of claim 1 which further comprises a mount, said mount supporting said motor within said housing chamber.

6. The mechanism of claim 1 in which further comprises a bearing, said bearing being positioned between said support and said rotor.

7. The mechanism of claim 6 in which said motor lies within said housing chamber.

8. The mechanism of claim 6 in which said resilient link comprises a spring.

9. The mechanism of claim 6 in which said resilient band comprises an "O" ring.

10. The mechanism of claim 6 which further comprises a mount, said mount supporting said motor within said housing chamber.

\* \* \* \* \*